United States Patent [19]

Humphrey, Jr.

[11] 4,188,451
[45] Feb. 12, 1980

[54] POLYCARBONATE ARTICLE COATED WITH AN ADHERENT, DURABLE, SILICA FILLED ORGANOPOLYSILOXANE COATING AND PROCESS FOR PRODUCING SAME

[75] Inventor: James S. Humphrey, Jr., Clemmons, N.C.

[73] Assignee: General Electric Company, Pittsfield, Mass.

[21] Appl. No.: 12,579

[22] Filed: Feb. 15, 1979

Related U.S. Application Data

[63] Continuation-in-part of Ser. No. 895,790, Apr. 4, 1978, abandoned.

[51] Int. Cl.² .................. B32B 27/30; B32B 27/08; G02B 1/08
[52] U.S. Cl. .................... 428/331; 204/159.13; 427/54.1; 427/160; 427/163; 427/164; 427/387; 428/412; 428/447; 428/451; 428/448; 526/279
[58] Field of Search .............. 428/447, 412, 451, 448, 428/331; 204/159.13; 526/279; 427/54, 163, 164, 160, 387

[56] References Cited

U.S. PATENT DOCUMENTS

| | | | |
|---|---|---|---|
| 2,976,184 | 3/1961 | Blatz | 427/387 |
| 3,379,607 | 4/1968 | Foster | 428/447 |
| 3,396,046 | 8/1968 | Landau | 428/412 |
| 3,451,838 | 6/1969 | Burzynski | 428/412 |
| 3,582,398 | 6/1971 | Ringler | 428/412 |
| 3,650,808 | 3/1972 | Gagnon | 428/412 |
| 3,652,379 | 3/1972 | White | 428/412 |
| 3,661,685 | 5/1972 | Osteen | 428/412 |
| 3,681,167 | 8/1972 | Moore | 428/412 |
| 3,707,397 | 12/1972 | Gagnon | 428/412 |
| 3,835,090 | 9/1974 | Gander | 526/279 |
| 3,968,305 | 7/1976 | Oshima | 428/412 |
| 3,968,309 | 7/1976 | Matsuo | 428/409 |
| 3,978,178 | 8/1976 | Oshima | 428/412 |
| 3,986,997 | 10/1976 | Clark | 428/412 |
| 4,019,904 | 4/1977 | Noshiro | 204/159.13 |
| 4,026,826 | 5/1977 | Yoshida | 526/279 |
| 4,027,072 | 5/1977 | Molari | 428/412 |
| 4,027,073 | 5/1977 | Clark | 428/447 |
| 4,041,120 | 8/1977 | Oshima | 264/171 |
| 4,045,602 | 8/1977 | Sommer | 427/387 |
| 4,064,286 | 12/1977 | Hahn | 204/159.13 |
| 4,073,967 | 2/1978 | Sandvig | 204/159.13 |
| 4,082,635 | 4/1978 | Fritz | 428/447 |
| 4,100,329 | 7/1978 | Neithardt | 428/448 |
| 4,103,065 | 7/1978 | Gagnon | 428/447 |
| 4,133,938 | 1/1979 | Bingham | 428/447 |

*Primary Examiner*—Ellis P. Robinson
*Attorney, Agent, or Firm*—Myron B. Kapustij; William F. Mufatti

[57] ABSTRACT

A coated polycarbonate article comprising a polycarbonate substrate having (i) a primer layer comprising a UV cured reaction product of a polyfunctional acrylic ester monomer and an organic silicon compound of the formula $R^4_c SiX_{4-c}$ wherein $R^4$ is an organic group containing olefinic unsaturation, X is an alkoxy, acyloxy and aryloxy group, and c is an integer of from 1 to 3; and (ii) a thermoset silica filled organopolysiloxane top coating on said UV cured primer layer.

A process for producing a coated polycarbonate article comprising (i) priming a polycarbonate substrate with a UV curable primer composition containing (a) a polyfunctional acrylic ester monomer, (b) an organic silicon compound of the formula $R^4_c SiX_{4-c}$ wherein R, X and c are as defined above, (c) a UV photoinitiator, and (d) resorcinol monobenzoate; (ii) UV curing said primer composition; (iii) applying a silica filled organopolysiloxane coating composition to the primed substrate; and (iv) curing the silica filled organopolysiloxane.

43 Claims, No Drawings

POLYCARBONATE ARTICLE COATED WITH AN ADHERENT, DURABLE, SILICA FILLED ORGANOPOLYSILOXANE COATING AND PROCESS FOR PRODUCING SAME

This application is a continuation-in-part of copending application Ser. No. 895,790, filed Apr. 4, 1978 now abandoned.

This invention relates to non-opaque, preferably transparent, silica filled organopolysiloxane coated polycarbonate articles wherein the silica filled organopolysiloxane top coat is tenaciously adhered to the polycarbonate substrate and to a process for producing such an article. More particularly, the present invention relates to a silica filled organopolysiloxane coated polycarbonate article having a primer layer between the polycarbonate and the silica filled organopolysiloxane top coat comprising the UV light cured reaction product of at least one polyfunctional acrylic acid ester monomer and a certain organic silicon compound. The process for producing said article comprising priming the polycarbonate substrate with an adhesion promoting, thermosettable composition comprised of a polyfunctional acrylic acid ester monomer, a specific organic silicon compound, a resorcinol monobenzoate, and a photocure initiator by forming a thin film thereon; curing said primer film by exposure to ultraviolet light; then coating the cured primed surface with a further curable silica filled organopolysiloxane top coat composition; and finally curing the silica filled further curable organopolysiloxane.

BACKGROUND OF THE INVENTION

The use of transparent glazing materials utilizing polycarbonate resin as a structural component for windows, windshields and the like are well known. While these polycarbonate resins are easily fabricated into the desired shape and have excellent physical and chemical properties, such as being less dense than glass and having more breakage resistance than glass, their abrasion, scratch and mar resistance is relatively low.

In order to overcome this relatively low scratch and mar resistance, various coatings have been applied to the polycarbonate resins. U.S. Pat. Nos. 3,451,838, 3,986,997 and 4,027,073 disclose a coating composition and technique for the application of organopolysiloxane coatings onto these surfaces. While these coatings have many desirable properteis, e.g., they are hard, mar-resistant, scratch-resistant, and chemical solvent resistant, these organopolysiloxane coatings do not in all instances possess the desired degree of uniform adherence to and durability on these polycarbonate surfaces. There is a need for polycarbonate articles having uniformly, tenaciously and durably adhered scratch, mar and chemical solvent resistant coatings thereon, and it is a primary object of the present invention to provide such articles and a relatively simple and economical process for producing these articles.

DESCRIPTION OF THE INVENTION

This invention relates to silica filled organopolysiloxane coated polycarbonate articles having an adhesion promoting primer layer and to a process for producing these articles.

In the practice of the present invention, prior to the application of the silica filled organopolysiloxane coating to the polycarbonate surface, the surface is first primed by the application of a UV curable primer composition containing a polyfunctional acrylic ester monomer, an organic silicon compound, and a UV photoinitiator. This primer composition is cured by exposure to UV light, and then the silica filled organopolysiloxane coating is applied thereon.

The aromatic carbonate polymer of the instant invention has recurring units of the formula:

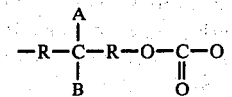

wherein each —R— is selected from the group consisting of phenylene, halo-substituted phenylene and alkyl substituted phenylene; and A and B are each selected from the group consisting of hydrogen, hydrocarbon radicals free from aliphatic unsaturation and of radicals which together with the adjoining

atom form a cycloalkane radical, the total number of carbon atoms in A and B being up to 12.

The aromatic carbonate polymers of this invention may be prepared by methods well known in the art and as described in U.S. Pat. Nos. 3,161,615; 3,220,973; 3,312,659; 3,312,660; 3,313,777; 3,666,614; and 3,989,672, all of which are incorporated by reference.

Also, included herein are branched polycarbonates wherein a polyfunctional aromatic compound is reacted with the dihydric phenol and carbonate precursor to provide a thermoplastic randomly branched polycarbonate wherein the recurring units of formula I. contain branching groups.

The preferred polycarbonate resins may be derived from the reaction of bisphenol-A and phosgene. These polycarbonates have from 10–400 recurring units of the formula:

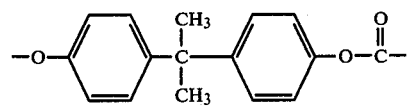

The polycarbonate should have an intrinsic viscosity between 0.3 and 1.0, preferably from 0.40 to 0.65 measured at 25° C. in methylene chloride.

The UV curable primer composition comprises: (i) at least one polyfunctional acrylic ester monomer; (ii) at least one organic silicon compound; and, (iii) a UV cure initiator. The polyfunctional acrylic ester monomers of the present invention are represented by the general formula:

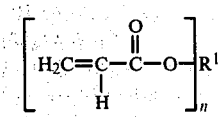

wherein n is an integer from 2 to 8 inclusive, preferably from 2 to 6 inclusive, and more preferably from 2 to 4 inclusive; $R^1$ is a n valent saturated aliphatic hydrocarbon radical, n valent substituted saturated aliphatic hydrocarbon radical, n valent ether radical, n valent polyether radical, n valent substituted ether radical, n valent substituted polyether radical, n valent olefinically unsaturated aliphatic hydrocarbon radical, n valent substituted olefinically unsaturated aliphatic hydrocarbon radical, n valent aromatic hydrocarbon radicals, and n valent substituted aromatic hydrocarbon radicals.

By n valent saturated aliphatic hydrocarbon radicals is meant n valent radicals derived from saturated aliphatic hydrocarbons, i.e., alkanes, by removal of n hydrogens therefrom. Preferred n valent saturated aliphatic hydrocarbon radicals are those containing from 1 to about 20 carbon atoms. Some nonlimiting examples of these preferred n valent saturated aliphatic hydrocarbon radicals include —CH$_2$—, —CH$_2$CH$_2$—,

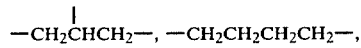

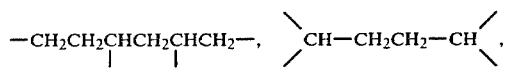

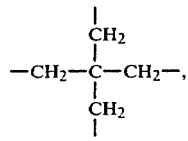

and the like.

These n valent saturated aliphatic hydrocarbon radicals may contain substituent groups thereon. Preferred n valent substituted saturated aliphatic hydrocarbon radicals are those containing from 1 to about 20 carbon atoms. These preferred n valent substituted saturated aliphatic hydrocarbon radicals can contain substituent groups such as the halogens, i.e., fluorine, chlorine, bromine and iodine, hydroxyl, —COOR$^2$, —OR$^2$, —CN, —COOH, —NO$_2$, —NH$_2$, and —NR$^2$ wherein $R^2$ represents alkyl radicals containing from 1 to about 6 carbon atoms. Some non-limiting examples of n valent substituted saturated aliphatic hydrocarbon radicals include

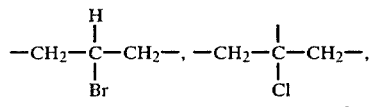

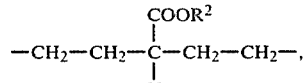

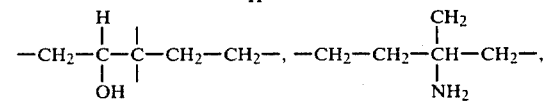

and the like.

By n valent olefinically unsaturated aliphatic hydrocarbon radicals is meant n valent radicals derived from olefinically unsaturated aliphatic hydrocarbons, i.e., alkenes, by removal of n hydrogens therefrom. Preferred n valent olefinically unsaturated aliphatic hydrocarbon radicals are those containing from 2 to about 20 carbon atoms. Some non-limiting examples of these radicals include —CH=CH—, —CH$_2$—CH=CH—CH$_2$—,

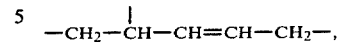

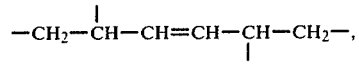

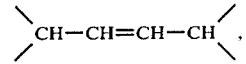

and the like.

These n valent olefinically unsaturated aliphatic hydrocarbon radicals may contain substutuent groups thereon. Preferred n valent substituted olefinically unsaturated aliphatic hydrocarbon radicals are those containing from 2 to about 20 carbon atoms. These radicals can contain substituent groups such as the halogens, —COOR$^2$, —OR$^2$, —CN, —COOH, —NO$_2$, —NH$_2$ and —NR$^2$ wherein $R^2$ is as defined above. Some non-limiting examples of n valent substituted olefinically unsaturated aliphatic hydrocarbon radicals include

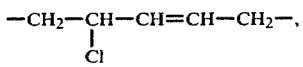

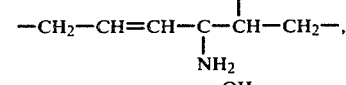

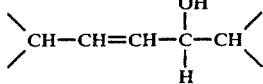

and the like.

By n valent ether radicals is meant n valent radicals derived from ethers by removal of n hydrogens therefrom. Preferred n valent ether radicals are those containing from 2 to about 20 carbon atoms. Some nonlimiting examples of these n valent ether radicals include —CH$_2$—O—CH$_2$—, >CH—CH$_2$—O—CH$_2$—CH<,

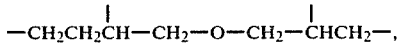

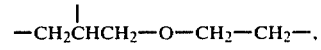

and the like.

These n valent ether radicals may contain substituent groups thereon. Preferred n valent substituted ether radicals are those containing from 2 to about 20 carbon atoms. These radicals can contain substituent groups such as the halogens —COOR$^2$, —OR$^2$, —CN, —COOH, —NO$_2$, —NH$_2$ and —NR$^2$ wherein $R^2$ is as defined above. Some non-limiting examples of n valent substituted ether radicals include

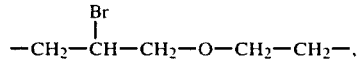

-continued

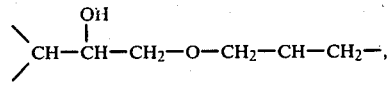

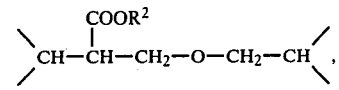

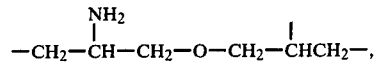

and the like.

By n valent polyether radicals is meant n valent radicals derived from polyethers, which polyethers are represented by the general formula $-R^3O-_x$ wherein x is an integer from 2 to about 5 and $R^3$ is a lower alkyl, by removal of n hydrogens therefrom. Preferred n valent polyether radicals are those containing from 3 to about 20 carbon atoms. Some non-limiting examples of these n valent polyether radicals include $-CH_2-CH_2-O-CH_2CH_2-O-CH_2CH_2-$, $>CH-CH_2-O-CH_2CH_2-O-CH_2CH<$, $-CH_2-O-CH_2-O-CH_2-$,

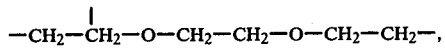

and the like.

These n valent polyether radicals may contain substituent groups such as halogens, hydroxyl, $-COOR^2$, $-CN$, $-COOH$, $-NO_2$, $-NH_2$ and $-NR^2$ thereon. Some non-limiting examples of these n valent substituted polyether radicals include By n valent aromatic hydrocarbon radicals is meant n valent radicals derived from aromatic hydrocarbons, e.g., benzene, naphthalene and anthracene, by removal of n hydrogens therefrom. Preferred n valent aromatic hydrocarbon radicals are those containing from 6 to 18 carbon atoms. Some non-limiting examples of these preferred n valent saturated aliphatic hydrocarbon radicals include

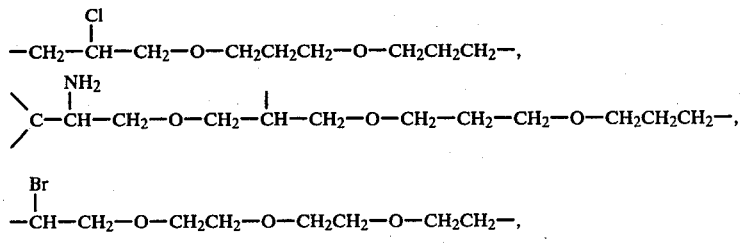

and the like. These n valent aromatic hydrocarbon radicals may further contain substituent groups such as hologens, lower alkyls, hydroxyl, $-COOR^2$, $-COOH$, $-NH_2$, $-NR^2$, $-NO_2$, $-OR^2$ and $-CN$ thereon.

It is to be understood that where substituent groups are present on any of the aforedescribed radicals, they should be such that they do not unduly hinder or interfere with the photocure of the polyfunctional acrylic monomers.

In the practice of the present invention, it is preferred that $R^1$ be an n valent saturated aliphatic hydrocarbon radical, a n valent ether radical, or a n valent polyether radical.

More particularly, the difunctional acrylic monomers, or diacrylates, are represented by formula III wherein n is 2; the trifunctional acrylic monomers, or triacrylates, are represented by formula III wherein n is 3; and the tetra-functional acrylic monomers, or tetraacrylates, are represented by formula III wherein n is 4.

Illustrative of suitable polyfunctional acrylate ester monomers of formula III are those listed below in $-CH_2-\underset{\underset{Cl}{|}}{CH}-CH_2-O-CH_2CH_2CH_2-O-CH_2CH_2CH_2-$, $\diagdown\!\!\!\!\!\!\underset{/}{C}-\underset{\underset{NH_2}{|}}{CH}-CH_2-O-CH_2-\underset{|}{CH}-CH_2-O-CH_2-CH_2-CH_2-O-CH_2CH_2CH_2-$, $-\underset{\underset{Br}{|}}{CH}-CH_2-O-CH_2CH_2-O-CH_2CH_2-O-CH_2CH_2-$, and the like.

TABLE I.

TABLE I

| Diacrylates of Formula III |
|---|
| 1. $CH_2=CHCOO-CH_2-OOCCH=CH_2$ |
| 2. $CH_2=CHCOO-CH_2-CH_2-OOCCH=CH_2$ |
| 3. $CH_2=CHCOO-CH_2-CHOHCH_2-OOCCH=CH_2$ |
| 4. $CH_2=CHCOO-(CH_2)_6-OOCCH=CH_2$ |
| 5. $CH_2=CHCOO-CH_2-CH_2-\underset{\underset{OOCCH=CH_2}{\vert}}{CH}-CH_3$ |
| 6. $CH_2=CHCOO-CH_2CH_2OCH_2CH_2-OOCCH=CH_2$ |
| 7. $CH_2=CHCOO-CH_2CH_2OCH_2CH_2OCH_2CH_2OCH_2CH_2-OOCCH=CH_2$ |
| 8. $CH_2=CHCOO-CH_2-\underset{\underset{CH_3}{\vert}}{\overset{\overset{CH_3}{\vert}}{C}}-OOCCH=CH_2$ |
| 9. $CH_2=CHCOO-CH_2-\underset{\underset{CH_3}{\vert}}{\overset{\overset{CH_3}{\vert}}{C}}-OOCCH=CH_2$ |

TABLE I-continued

10. $CH_2=CHCOO-CH_2-\underset{\underset{CH_3}{|}}{\overset{\overset{CH_2OH}{|}}{C}}-OOCCH=CH_2$ 11. $CH_2=CHCOO-CH_2-\underset{\underset{CH_2OH}{|}}{\overset{\overset{CH_2OH}{|}}{C}}-OOCCH=CH_2$ 12. $CH_2=CHCOO-CH_2-\underset{\underset{CH_2Br}{|}}{\overset{\overset{CH_2OH}{|}}{C}}-OOCCH=CH_2$

13. $CH_2=CHCOO-CH_2-CH=CH-CH_2-CH_3-OOCCH=CH_2$

14. $CH_2=CHCOO-CH_2-CH=CH-\underset{\underset{CH_2OH}{|}}{CH}-OOCH=CH_2$

15. $CH_2=CHCOO-CH_2-\underset{\underset{CH_2Cl}{|}}{\overset{\overset{CH_2OH}{|}}{C}}-CH_2OOCCH=CH_2$ 16. $CH_2=CHCOO-CH_2-\underset{\underset{OCH_3}{|}}{CH}-CH_2-OOCCH=CH_2$ 17. $CH_2=CHCOO-\text{C}_6\text{H}_4-OOCCH=CH_2$ 18. $CH_2=CHCOO-\text{C}_6\text{H}_3(CH_3)-OOCCH=CH_2$ 19. $CH_2=CHCOO-\text{C}_6\text{H}_3(Br)-OOCCH=CH_2$ 20. $CH_2=CHCOO-\text{C}_6\text{H}_3(OH)-OOCCH=CH_2$ 21. $CH_2=CHCOO-CH\ CHCH_2-OOCCH=CH_2$ (with phenyl)

22. $CH_2=CHCOO-CH_2CH_2\underset{\underset{}{}}{\overset{\overset{OOCHCH_2}{|}}{CH}}\ CH_2-OOCCH=CH_2$ Triacrylates of Formula III 23. $CH_2=CHCOO-CH_2$
    $CH_2=CHCOO-CH_2-\underset{\underset{CH_2=CHCOO-CH_2}{|}}{C}-CH_2-CH_3$ 24. $CH_2=CHCOO-CH_2-\underset{\underset{CH_2-OOCCH=CH_2}{|}}{\overset{\overset{CH_2OH}{|}}{C}}-CH_2-OOCCH=CH_2$ 25. $CH_2=CHCOO-\text{C}_6\text{H}_3(OOCCH=CH_2)-OOCCH=CH_2$ Tetraacrylates of Formula III TABLE I-continued 26.
```
       CH2=CHCOO—CH2
              |
CH2=CHCOO—CH2—C—CH2—OOCCH=CH2
              |
       CH2—CHCOO—CH2
```

27.
```
CH2=CHCOO—CH2CH—CHCH2—OOCCH=CH2
              |   |
    CH2=CHOO—CH2  CH2—OOCCH=CH2
```

28.
```
                    OH
                    |
CH2=CHCOO—CH2CHCH—CH2CH—OOCCH=CH2
         |              |
 CH2=CHCOO—CH2     CH2—OOCCH=CH2
```

These polyacrylate esters and their production are well known to those skilled in the art. One method of producing the di-, tri- and tetraacrylate esters involves reacting acrylic acid with a di-, tri-, or tetrahydroxyl compound to product the diester, triester or tetraester. Thus, for example, acrylic acid can be repeated with ethylene glycol to produce ethylene glycol diacrylate (compound 2 in TABLE I).

It is understood that the primer compositions may contain mixtures of two or more of the polyfunctional acrylate monomers or individual polyfunctional acrylate monomers. As a matter of fact, in certain instances, mixtures of two of said polyfunctional acrylates are preferred in the primer compositions.

The organic silicon compounds are represented by the formula $$R^4_c SiX_{4-c} \qquad \text{IV.}$$

wherein X independently represents an alkoxy, acyloxy and aryloxy group, $R^4$ represents an organic group containing olefinic unsaturation, and c is an integer from 1 to 3. Preferred alkoxy groups are those containing from 1 to about 10 carbon atoms. Exemplary preferred alkoxy groups include methoxy, propoxy, butoxy, pentoxy, heptoxy and the like. Preferred acyloxy groups are those containing from 2 to about 10 carbon atoms. Exemplary preferred alkoxy groups include acetoxy, propionoxy, butyroxy, pentanoxy, hexanoxy and the like. The preferred acyloxy group is phenoxy.

$R^4$ represents an organic group containing olefinic unsaturation such that the organic compound of formula IV will co-react with the polyfunctional acrylic acid ester monomer of formula III upon exposure to UV light and in the presence of a UV photoinitiator to form a thermoset reaction product which, when applied to a polycarbonate substrate, improves the adhesion of organopolysiloxanes to said substrate. More particularly, $R^4$ is a radical represented by the formula $$\begin{array}{c} Y \quad O \\ | \quad \| \\ CH_2=C-C-O-R^5- \end{array} \qquad \text{V.}$$

wherein $R^5$ is a divalent saturated aliphatic hydrocarbon radical, preferably containing from 1 to about 12 carbon atoms and more preferably containing from 2 to about 6 carbon atoms, and Y is hydrogen or methyl; and a maleamic acid represented by the formula

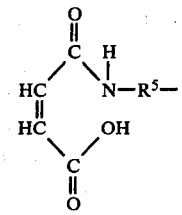

wherein $R^5$ is as defined above. Some non-limiting examples of $R^5$ include —CH$_2$CH$_2$—, —CH$_2$—CH$_2$—CH$_2$—,

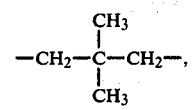

and the like.

The primer compositions of the instant invention may contain only one type of organic silicon compound of formula IV or they may contain mixtures of two or more, but preferably two, different organic silicon compounds. Thus, for example, the primer compositions may contain two different compounds of formula V, two different compounds of formula VI, or one compound of formula V and one compound of formula VI.

Generally, the primer composition contains, exclusive of any solvent present, 10 to about 90 weight percent of the polyfunctional acrylic acid ester monomer or mixtures thereof and from about 90 to about 10 weight percent of the organic silicon compound, preferably from about 20 to about 80 weight percent of the polyfunctional acrylic acid ester monomer and from about 80 to about 20 weight percent of the organic silicon compound, and more preferably from about 30 to about 70 weight percent of the polyfunctional acrylic acid ester monomer and from about 70 to about 30 weight percent of the organic silicon compound.

The photocurable primer compositions also contain a photoinitiating amount of photoinitiator, i.e., an amount effective to effect the photocure of the coating composition. Generally, this amount is from about 0.01% to about 10% by weight, preferably from about 0.1% to about 5% by weight of the photocurable primer composition, exclusive of any solvent present. These additives and the cure thereof are generally well known in the art. Some non-limiting examples of these UV radiation photosensitizers include ketones, such as benzophenone, acetophenone, benzil, benzyl methyl ketone; benzoins and substituted benzoins such as benzoin methyl ether, α-hydroxymethyl benzoin isopropyl ether; halogen containing compounds such as α-bromoacetophenone, p-bromoacetophenone, α-chlormethylnaphthalene; sulfur compounds such as aromatic disulfides; and other photosensitizers such as azides, thioketones, or mixtures or synergistic mixtures thereof; the diaryl peroxides; the hydroperoxides; the peracids and peresters; the azo compounds; or any other known free radical initiator, such as di-t-butyl peroxide, benzoyl peroxide, 2,4-dichlorobenzoyl peroxide, t-butyl hydroperoxide, peroxyacetic acid, peroxybenzoic acid, t-butyl peroxypivalate, t-butyl peracetate, azobisisobutyronitrile and the like.

The primer compositions of the present invention further contains a resorcinol monobenzoate. The resorcinol monobenzoate is preferably unsubstituted, although a lower alkyl substituted resorcinol monobenzoate may also be used. Generally, the resorcinol monobenzoate is present in an amount of from about 1 to about 10 percent by weight. Although the resorcinol monobenzoate or substituted resorcinol monobenzoate is generally not believed to be directly involved in the reaction between the polyfunctional acrylic acid ester monomer and the silicon containing compound, and, therefore, is not believed to be generally directly incorporated into the cured cross-linked polymer structure formed by the coreaction of the polyfunctional acrylic acid ester monomer and the silicon containing compound, it nevertheless functions in a manner to promote and increase the durability of adhesion of the silica filled organopolysiloxane top coat to the primary layer, especially upon exposure of the coated polycarbonate article to light. More specifically, during the cure of the primer layer by the action of ultraviolet light, the resorcinol monobenzoate present in said layer is converted, by the ultraviolet radiation, to a dihydroxybenzophenone. This dihydroxybenzophenone then acts, in the cured primer, as an ultraviolet light absorber and promotes the durability and adhesion of the silica filled organopolysiloxane top coat to the primer layer.

The primer compositions of the instant invention may also optionally contain various flatting agents, surface active agents and thixotropic agents. All of these additives and the use thereof are well known in the art and do not require extensive discussions. Therefore, only a limited number will be referred to, it being understood that any compounds possessing the ability to function in such a manner, i.e., as a flatting agent, surface active agent and the like, can be used so long as they do not deleteriously affect the photocuring of the primer compositions and do not adversely affect the non-opaque character of the coated polycarbonate article.

The various surface-active agents, including anionic, cationic and nonionic surface-active agents are described in Kirk-Othmer Encyclopedia of Chemical Technology, Vol. 19, Interscience Publishers, New York, 1969, pp. 507–593, and Encyclopedia of Polymer Science and Technology, Vol. 13, Interscience Publishers, New York, 1960, pp. 477–486, both of which are references and incorporated herein.

In the practice of the present invention, the photocurable primer compositions are first compounded by adding together the polyfunctional acrylic acid ester monomer, the organo silicon compound, the UV photoinitiator, the resorcinol monobenzoate, and, optionally, any of the other aforementioned additives. Additionally, if so desired to reduce the viscosity of the primer formulation or to aid in solubilizing the organo silicon compounds, an organic solvent may be incorporated into the formulation. Generally, the amount of solvent, if any, present should be such that evaporation of the solvent occurs before any deleterious effect on the substrate due to the aggressiveness (in the chemical etching sense) of the primer composition develops. The various components are thoroughly mixed so as to form a generally homogeneous primer composition. A thin, uniform film of the primer solution is then applied onto the polycarbonate surface by any of the known means such as dipping, spraying, roll-coating and the like. Generally, the primer composition is applied in an amount sufficient to provide a cured film of from about 0.5 mil to about 5.0 mil, preferably from about 0.1 mil to about 0.3 mil thick. The primer film is then cured in an inert, e.g., nitrogen, atmosphere, by UV irradiation which can have a wavelength of from 1849 A. to 4000 A. The lamp systems used to generate such radiation can consist of ultraviolet lamps which can consist of discharge lamps, as for example, xenon, metallic halide, metallic arc, such as low or high pressure mercury vapor discharge lamps, etc., having generating pressure of from as low as a few millitorr up to about 10 atmospheres, can be employed. After UV curing, there is present on the surface of the polycarbonate a non-opaque primer which is adhered to the polycarbonate. This cured primer is the reaction product of the polyfunctional acrylic ester monomer and the organic silicon compound. While not wishing to be bound by any theory, it is believed that the cure of this primer composition occurs through (i) the polymerization of the polyfunctional acrylic ester monomers with each other, (ii) by the polymerization of the organic silicon compounds with each other, and (iii) by the coreaction between the polyfunctional acrylate monomers and/or polymers with the organic silicon compound and/or polymers thereof through the olefinic unsaturation present in each. The resultant reaction product is a thermoset resin which is tenaciously adhered to the polycarbonate substrate.

The silica filled organopolysiloxane coating is applied onto this UV light cured primer. In the practice of this invention, a silica filled organopolysiloxane coating composition, such as that described in U.S. Pat. Nos. 3,986,997 and 4,027,073, containing a further curable organopolysiloxane and colloidal silica is applied onto the cured primer and is then cured to form a thermoset silica filled organopolysiloxane coating.

The silica filled further curable organopolysiloxane top coat composition comprises a dispersion of colloidal silica in a lower aliphatic alcohol-water solution of the partial condensate of a silanol having the formula $R^6Si(OH)_3$   VII.

wherein $R^6$ is selected from the group consisting of alkyl radicals containing from 1 to 3 carbon atoms, the vinyl radical, the 3,3,3-trifluoropropyl radical, the gamma-glycidoxypropyl radical and the gamma-methacryloxypropyl radical, with at least 70 percent by weight of said silanol being $CH_3Si(OH)_3$. This composition generally contains from about 10 to about 50 percent by weight of solids, said solids consisting essentially of a mixture of from about 10 to about 70 percent by weight of colloidal silica and from about 30 to about 90 percent by weight of the partial condensate of a silanol. The partial condensate of a silanol, i.e., a siloxanol, is obtained, preferably, entirely from the condensation of $CH_3Si(OH)_3$, however, the partial condensate may also optionally be comprised of a major portion which is obtained from the condensation of $CH_3Si(OH)_3$ and a minor portion which is obtained from the condensation of monoethyltrisilanol, monopropyltrisilanol, monovinyltrisilanol, mono gamma-methacryloxy-propyltrisilanol, mono gamma-glycidoxypropyltrisilanol, or mixtures thereof. The composition further contains sufficient acid to provide a pH in the range of 3.0 to 6.0. The pH is maintained in this range in order to prevent premature gellation and increase the shelf life of the silica filled organopolysiloxane top coat composition and to obtain optimum properties in the cured coating. Suitable acids include both organic and inorganic acids such as hydrochloric, chloroacetic, acetic, citric, benzoic, formic, propionic, maleic, oxalic, glycolic and the like. The acid can be added to either the silane, which hydrolyzes to form the silanol component of the composition, or the hydroxol prior to mixing the two components.

The trisilanol component of the top coat composition of the present invention is generated in situ by the addition of the corresponding trialkoxysilanes to aqueous dispersions of colloidal silica. Suitable trialkoxysilanes are those containing methoxy, ethoxy, isopropoxy and t-butoxy substituents. Upon generation of the silanol in the acidic aqueous medium, there is condensation of the hydroxyl substituents to form —Si—O—Si bonding. The condensation is not complete, but rather the siloxane retains an appreciable quantity of silicon-bonded hydroxyl groups, thus rendering the organopolysiloxane polymer soluble in the water-alcohol solvent. This soluble partial condensate can be characterized as a siloxanol polymer having at least one silicon-bonded hydroxyl group per every three —SiO— units. During curing of the top coating composition on the primer, these residual hydroxyl groups condense to give a silsesquioxane, $R^6SiO_{3/2}$.

The silica component of the top coat composition is present in the form of colloidal silica. Aqueous colloidal silica dispersions generally have a particle size in the range of 5 to 150 millimicrons in diameter. These silica dispersions are prepared by methods well known in the art and are commercially available. It is preferred to use colloidal silica having a particle size in the range of 10 to 30 millimicrons in diameter in order to obtain dispersions having a greater stability to provide top coatings having superior optical properties.

The silica filled organopolysiloxane top coat compositions are prepared by adding trialkoxysilanes to colloidal silica hydrosol and adjusting the pH to a range of 3.0 to 6.0 by the addition of acid. As mentioned previously, the acid can be added to either the silane or the silica hydrosol before the two components are mixed. Alcohol is generated during the hydrolysis of the trialkoxy silanes to the trisilanols. Depending upon the percent solids desired in the final coating composition, additional alcohol, water, or a water-miscible solvent can be added. Suitable alcohols are the lower aliphatic alcohols such as methanol, ethanol, isopropanol, t-butanol, and mixtures thereof. Generally, the solvent system should contain from about 20 to about 75 weight percent alcohol to ensure solubility of the siloxanol formed by the condensation of the silanol. If desired, a minor amount of an additional water-miscible polar solvent such as acetone, butyl cellosolve, and the like can be added to the water-alcohol solvent system. Generally, sufficient alcohol or water-alcohol solvent is added to give a composition containing from about 10 to about 50 percent by weight of solids, said solids generally comprising from about 10 to about 70 percent by weight of colloidal silica and from about 30 to about 90 percent by weight of the partial condensate of the silanol. The composition is allowed to age for a short period of time to ensure formation of the partial condensate of the silanol, i.e., the siloxanol. This condensation occurs upon generation of the silanol in the acidic aqueous medium through the hydroxyl substituents to form Si-—O—Si bonding. The condensation is not complete, resulting in a siloxane having an appreciable quantity of silicon-bonded hydroxyl group. This aged, silica filled further curable organopolysiloxane top coat composition is then applied onto the primed polycarbonate by any of the commonly known methods such as dipping, spraying, flow-coating and the like. After the top coat composition is applied to the primed polycarbonate, the polycarbonate is air dried to evaporate the volatile solvents from the top coat composition. Thereafter, heat is applied to cure the top coat. During curing, the residual hydroxyls of the siloxane condense to give a silsesquioxane, $R^6SiO_{3/2}$. The result is a silica filled cross-linked organopolysiloxane top coat which is tenaciously adhered to the substrate and is highly resistant to scratching, abrasion, chemical solvents, and marring. Generally, the top coat contains from about 10 to about 70 weight percent silica and from about 30 to about 90 weight percent of the organopolysiloxane present as the silsesquioxane, $R^6SiO_{3/2}$.

The thickness of the top coat generally is dependent upon the method of application and upon the weight percent solids present in silica filled further curable organopolysiloxane top coat composition. In general, the higher the percent solids, and the longer the application time, the greater the thickness of the top coat. It is preferred that the cured top coat have a thickness of from about 0.1 to about 0.5 mils, more preferably from 0.15 to about 0.4 mils, and most preferably from about 0.2 to about 0.25 mils.

Another embodiment of the present invention is a process of producing a mar, abrasion, scratch and chemical resistant polycarbonate article. The process comprises the steps of: (i) applying onto the polycarbonate an ultraviolet light curable primer composition containing (a) at least one polyfunctional acrylic acid ester monomer represented by formula III, (b) at least one organic silicon compound containing at least one olefinically unsaturated organic group, said compound being represented by formula IV, (c) an ultraviolet light photoinitiator, and (d) a resorcinol monobenzoate; (ii) applying ultraviolet light of sufficient strength and for a period of time effective to cure said primer composition and form a cured primer layer on said polycarbonate substrate, said cured primer layer containing the reaction products of said polyfunctional acrylic acid ester monomer and said organo silicon compound and further containing the photoreaction products of said resorcinol monobenzoate, alkyl substituted resorcinol monobenzoate, or mixtures thereof; (iii) applying a silica filled further curable organopolysiloxane top coat composition onto said cured primer layer, the top coat composition comprising a dispersion of colloidal silica in a lower alkanol-water solution of the partial condensate of a silanol of the formula $R^6Si(OH)_3$ in which $R^6$ is selected from the group consisting of alkyl radicals containing from 1 to 3 carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$; (iv) evaporating off the volatile solvents present in the top coat composition; and (v) curing the top coating by the application of heat thereto to form a silica filled thermoset organopolysiloxane, i.e., a silsesquioxane.

PREFERRED EMBODIMENT OF THE INVENTION

In order that those skilled in the art may better understand how the present invention may be practiced, the following examples are given by way of illustration and not by way of limitation.

EXAMPLE 1

An aromatic polycarbonate is prepared by reacting 2,2-bis(4-hydroxyphenyl)propane and phosgene in the presence of an acid acceptor and a molecular weight regulator and having an intrinsic viscosity of 0.57. The product is then fed to an extruder, which extruder is operated at about 265° C. and the extrudate is comminuted into pellets.

The pellets are then injection molded at about 315° C. into test panels of about 4 in. by 4 in. by about ⅛ in. thick. The test panels are subjected to an abrasion test. The abrasion test is one wherein test panels having a ¼ inch diameter hole cut in the center are subjected to a Taber Abraser. The Taber Abraser is equipped with CS-10F wheels which are resurfaced every 200 cycles by abrading for 25 cycles on a S-11 refacing disc. The weights used in combination with the CS-10F wheels are 500 gm. weights. Initial measurements of % Haze are made at four places around the future wear track of the sample using a Gardner Hazemeter. The sample is abraded for 500 cycles, cleaned with isopropanol, and the % Haze is remeasured at the same four places. The four differences in % Haze are calculated and averaged to give the Δ% Haze. The results are set forth in Table IV.

EXAMPLE 2

A primer composition is prepared by blending 50 gms. of 1,6-hexanediol diacrylate, 50 gms. of a 50% ethanolic solution of N-[3-(triethoxysilyl)propyl] maleamic acid which has been aged, i.e., allowed to stand for an extended period of time, 1.5 gms. of α,α-diethoxyacetophenone, 7.5 gms. of resorcinol monobenzoate, and 750 gms. of isobutanol. To 250 gms. of this solution are added 250 gms. of isobutanol. A thin film of this primer composition is applied to polycarbonate test panels prepared in accordance with Example 1. The film is cured by passing the polycarbonate panels through a combination Linde photocuring apparatus (this consists of a variable speed conveyor running through a chamber containing germicidal type mercury vapor lamps which emit light mainly at 2537 A°, 3150 A°, and 3605 A°) wherein the nitrogen pressure is 25 psi nitrogen and the speed of the conveyor is 30 ft/min. The film is tack free and cured after this treatment.

EXAMPLE 3

A primer composition is prepared by blending 250 gms. of 1,6-hexanediol diacrylate, 125 gms. of an aged 50% ethanolic solution of N-[3-(triethoxysilyl)propyl] maleamic acid, 62 gms. of pentaaerythitol-triacrylate, 7.5 gms. of α,α-diethoxyacetophenone, 1.2 gms. of resorcinol monobenzoate and 600 gms. of isobutanol. 250 gms. of the resulting solution is diluted in 1900 gms. of isobutanol. A thin film of this primer composition is applied to polycarbonate test panels prepared in accordance with Example 1. The film is cured by priming through a Linde photocuring apparatus as set forth in Example 2.

EXAMPLE 4

A primer composition is prepared by blending 250 gms. of 1,6-hexanediol diacrylate, 125 gms. of γ-methacryloxy-propyl trimethoxysilane, 62 gms. of trimethylolpropane triacrylate, 7.5 gms. of α,α-diethoxyacetophenone, 36.5 gms. of resorcinol monobenzoate, and 600 gms. of isobutanol. To 250 gms. of the resulting solution are added 1900 gms. of isobutanol.

A silica filled organopolysiloxane top coat composition containing 37 weight percent solids, 50% of which are $SiO_2$, is formulated by adding a commercially available aqueous dispersion of colloidal silica, having $SiO_2$ of approximately 13–14 millimicron particle size, to methyltrimethoxysilane which has been acidified by the addition of 2.5 weight percent glacial acetic acid. This composition is mixed for four hours and is then adjusted to a pH of 3.9 by addition of more glacial acetic acid. This acidified composition is then diluted to 18% solids by the addition of isopropanol and aged for four days to ensure formation of the partial condensate of $CH_3Si(OH)_3$.

EXAMPLE 5

Unprimed polycarbonate panels are prepared in accordance with Example 1 and are flow-coated with a silica filled organopolysiloxane top coat composition prepared substantially as set forth above. The coated unprimed panels are air dried for 30 minutes to evaporate the solvent, followed by a one hour bake at 250° F. to cure the further curable organopolysiloxane.

These coated, unprimed panels, as well as the coated, primed panels described below, are subjected to various tests designed to determine the durability of the coating on the substrate. One of these durability tests is a weathering test which includes exposing the coated samples in a 6 kilowatt Xenon arc Weather-O-Meter ® manufactured by Atlas Electric Devices Co. After exposure to the Weather-O-Meter ® for a predetermined time, the coated samples are subjected to an adhesion test. This test consists of using a multiple blade tool to cut parallel grooves about 1 mm apart through the coating into the substrate, rotating the sample 90° and repeating the cutting process thereby forming a grid pattern of 1 mm squares cut into the coating, and applying an adhesive tape over the cross-hatched area and quickly pulling said tape off. A sample fails the adhesion test if any of the squares in the grid are pulled off. The results of the Weather-O-Meter ® and adhesion test are set forth in Table II below.

Another test designed to determine the durability of the silica filled organopolysiloxane coating on the substrate involves subjecting the coated samples to a humidity test. This test involves subjecting samples to a number of humidity oven cycles, and after each cycle subjecting said samples to the aforedescribed adhesion test. One humidity oven cycle consists of placing the sample into a cabinet maintained at 99% relative humidity and 80°–85° F., raising the temperature to 140° F., maintaining the temperature at 140° F. for 6 hours, and thereafter lowering the temperature to 80°–85° F., at which time one cycle is complete and the sample is removed and undergoes the adhesion test. The results of this test are set forth in Table III below.

Yet another test used to ascertain the durability and adhesion of the silica filled o-ganopolysiloxane coating on the substrate is the sunlamp aging test. This test is one wherein the sample undergoes severe exposure to ultraviolet radiation. In the sunlamp aging test, the coated samples are exposed to an RS-sunlamp, and after exposure for a predetermined period of time are removed and subjected to the adhesion test. The results of this test are set forth in Table V.

EXAMPLE 6

Primed polycarbonate panels are prepared in accordance with Example 2 and are flow coated with a silica filled organopolysiloxane top coat composition prepared substantially as set forth above. These panels are air dried for 30 minutes to evaporate the solvent, followed by a one-hour bake at 250° F. to cure the further curable organopolysiloxane. These primed, top coated panels are then exposed to the afore-described weathering test, humidity test, abrasion test and sunlamp aging test and the results are set forth in Tables II, III, IV and V, respectively.

EXAMPLE 7

Primed polycarbonate panels are prepared in accordance with Example 3 and are flow coated with a silica filled organopolysiloxane top composition prepared substantially as set forth above. These panels are air dried for 30 minutes to evaporate the solvent, followed by a one-hour bake at 250° F. to cure the further curable organopolysiloxane. These primed, top coated panels are then subjected to the afore-described weathering test, humidity test, an abrasion test, and the sunlamp aging test and the results are set forth in Tables II, III, IV and V, respectively.

TABLE II

| | Weathering Test |
|---|---|
| | No. of hours exposure in the Weather-O-Meter ® at which sample fails adhesion test |
| Example No. | |
| 5 | 300 |
| 6 | Over 700 |
| 7 | Over 700 |

TABLE III

| | Humidity Test |
|---|---|
| | No. of cycles in humidity oven after which sample fails adhesion test |
| Example No. | |
| 5 | 1 |
| 6 | Passes adhesion test after 30 cycles |
| 7 | Passes adhesion test after 30 cycles |

TABLE IV

| | Abrasion Resistance |
|---|---|
| Example No. | Δ % Haze |
| 1 | 34 |
| 6 | 4.1 |
| 7 | 2.3 |

TABLE V

| | Sunlamp Aging Test |
|---|---|
| Example No. | No. of hours exposure to RS-sunlamp at which sample fails adhesion test |
| 5 | 36 hours |
| 6 | Between 100–200 hours |
| 7 | Between 100–200 hours |

Furthermore, a sample prepared in accordance with Example 6 which had been exposed in the Weather-O-Meter for about 1000 hours was subjected to the abrasion test. It was found that the Δ% haze of this weathered sample was 4.2, which is almost the same as the 4.1% haze for the unweathered sample, as set forth in Table IV above.

From the forgoing examples and Tables, it is quite evident that the durability of a silica filled organopolysiloxane top coat which is applied onto a polycarbonate substrate primed in accordance with the present invention is greatly improved over the same top coat applied to an unprimed polycarbonate substrate.

The foregoing disclosure of this invention is not to be considered as limiting, since many variations may be made by those skilled in the art without departing from the scope or spirit of the foregoing description.

What is claimed is:

1. A polycarbonate article having improved scratch, mar, abrasion and chemical solvent resistance comprising a polycarbonate substrate having deposited thereon: (i) an ultraviolet radiation cured primer layer which contains the photoreaction products of (a) at least one polyfunctional acrylic acid ester monomer, and (b) at least one organic silicon compound represented by the general formula $$R^4_c SiX_{4-c}$$

wherein c is an integer from 1 to 3 inclusive, X is an alkoxy, acyloxy or aryloxy radical, and $R^4$ represents a radical selected from

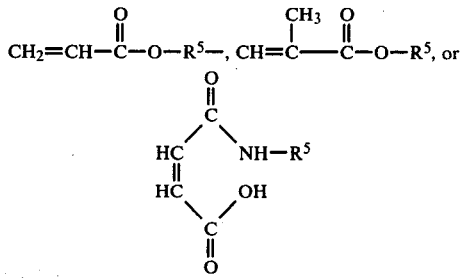

wherein $R^5$ is a divalent saturated aliphatic hydrocarbon radical; and (ii) having deposited on said primer layer a cured top coat containing a colloidal silica filled thermost organopolysiloxane.

2. The polycarbonate article of claim 1 wherein said cured primer layer further contains the photoreaction products of resorcinol monobenzoate, alkyl substituted resorcinol monobenzoate or mixtures thereof.

3. The article of claim 2 wherein said polyfunctional acrylic acid ester monomer is represented by the formula

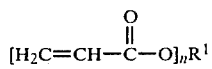

wherein n is an integer from 2 to 4 inclusive and $R^1$ is selected from the group consisting of a n valent saturated aliphatic hydrocarbon radical, n valent substituted saturated aliphatic hydrocarbon radical, n valent olefinically unsaturated aliphatic hydrocarbon radical, n valent substituted olefinically unsaturated aliphatic hydrocarbon radical, n valent ether radical, n valent substituted ether radical, n valent polyether radical, n valent substituted polyether radical, n valent aromatic hydrocarbon radical, and n valent substituted aromatic hydrocarbon radical.

4. The article of claim 3 wherein $R^1$ is selected from the group consisting of an n valent saturated aliphatic hydrocarbon radical, n valent olefinically unsaturated aliphatic hydrocarbon radical, n valent ether radical, n valent polyether radical, and n valent aromatic hydrocarbon radical.

5. The article of claim 4 wherein $R^1$ is selected from the group consisting of a n valent saturated aliphatic hydrocarbon radical, n valent ether radical, and n valent polyether radical.

6. The article of claim 1 wherein $R^4$ represents a radical having the formula

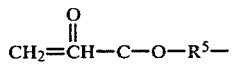

wherein $R^5$ is a divalent saturated aliphatic hydrocarbon radical.

7. The article of claim 1 wherein $R^4$ represents a radical having the formula

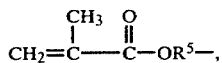

wherein $R^5$ is a divalent saturated aliphatic hydrocarbon radical.

8. The article of claim 1 wherein $R^4$ represents a radical having the formula

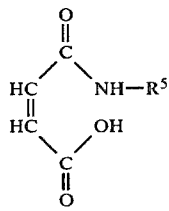

wherein $R^5$ is a divalent saturated aliphatic hydrocarbon radical.

9. The article of claim 1 wherein X is an alkoxy radical.

10. The article of claim 9 wherein said alkoxy radical is an ethoxy radical.

11. The article of claim 9 wherein said alkoxy radical is a methoxy radical.

12. The article of claim 5 wherein c is 1.

13. The article of claim 1 wherein said thermoset organopolysiloxane is a condensation product of a silanol having the formula $R^2Si(OH)_3$, wherein $R^6$ is selected from the group consisting of an alkyl radial of from 1 to 3 carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$.

14. The article of claim 3 wherein said thermoset organopolysiloxane is the condensation product of $CH_3Si(OH)_3$.

15. The article of claim 3 wherein said top coat contains from about 10 to about 70 weight percent of colloidal silica and from about 30 to about 90 weight percent of the condensation product of said silanol.

16. A polycarbonate article having improved scratch, mar, abrasion and chemical solvent resistance comprising a polycarbonate substrate having thereon (i) an ultraviolet radiation cured primer layer, said cured primer layer being the photoreaction product of a primer composition containing at least one polyfunctional acrylic acid ester monomer, at least one organic silicon compound containing at least one organic group having olefinic unsaturation, a photoinitiator, and a compound selected from resorcinol monobenzoate, lower alkyl substituted resorcinol monobenzoate, or mixtures thereof; and (ii) a cured colloidal silica filled thermoset organopolysiloxane top coat on said cured primer layer, said top coat being the thermally cured product of a top coat composition comprising a dispersion of colloidal silica in a lower aliphatic alcohol-water solution of the partial condensate of a silanol of the formula $R^6Si(OH)_3$ wherein $R^6$ is selected from the group consisting of alkyl radicals containing 1 to 3 carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$, said composition containing sufficient acid to provide a pH in the range of 3.0 to 6.0.

17. The article of claim 16 wherein said organic silicon compound is represented by the general formula

wherein c is an integer from 1 to 3 inclusive, X is an alkoxy, acyloxy or aryloxy radical, and $R^4$ is a compound represented by the formula

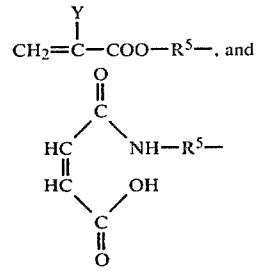

wherein Y is hydrogen or methyl, and $R^5$ is a divalent saturated aliphatic hydrocarbon radical.

18. The article of claim 17 wherein said polyfunctional acrylic acid ester monomer is represented by the general formula

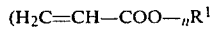

wherein n is an integer from 2 to 4 inclusive, and $R^1$ is a n valent saturated aliphatic hydrocarbon radical, n valent substituted saturated aliphatic hydrocarbon radical, n valent olefinically unsaturated aliphatic hydrocarbon radical, n valent substituted olefinically unsaturated hydrocarbon radical, n valent ether radical, n valent substituted ether radical, n valent polyether radical, n valent substituted polyether radical, n valent aromatic radical, and n valent substituted aromatic radical.

19. The article of claim 18 wherein $R^1$ is selected from the group consisting of a n valent saturated aliphatic hydrocarbon radical, n valent olefinically unsaturated aliphatic hydrocarbon radical, n valent ether radical, n valent polyether radical and n valent aromatic hydrocarbon radical.

20. The article of claim 19 wherein $R^1$ is selected from the group consisting of a n valent aliphatic hydrocarbon radical, n valent ether radical, and n valent polyether radical.

21. The article of claim 20 wherein X is an alkoxy group.

22. The article of claim 21 where $R^4$ is a compound represented by the formula

$$CH_2=CH-COO-R^5-$$

wherein $R^5$ is a divalent saturated aliphatic hydrocarbon radical.

23. The article of claim 21 wherein $R^4$ is a compound represented by the formula

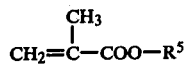
$$\begin{array}{c} CH_3 \\ | \\ CH_2=C-COO-R^5 \end{array}$$

wherein $R^5$ is a divalent saturated aliphatic hydrocarbon radical.

24. The article of claim 21 wherein $R^4$ is a compound represented by the formula

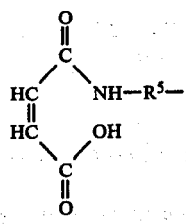

wherein $R^5$ is a divalent saturated aliphatic hydrocarbon radical.

25. A process for producing a mar, abrasion, scratch and chemical solvent resistant polycarbonate article comprising the steps of:
(i) applying onto the polycarbonate an ultraviolet radiation curable primer composition containing (a) at least one polyfunctional acrylic acid ester monomer, (b) at least one organic silicon compound containing at least one organic group having olefinic unsaturation, (c) resorcinol monobenzoate, alkyl substituted resorcinol monobenzoate, or mixtures thereof, and (d) a photo-initiator;
(ii) curing said primer composition by exposure to ultraviolet radiation to form a cured primer layer;
(iii) applying onto said cured primer layer a silica filled further curable organopolysiloxane top coat composition comprising a dispersion of colloidal silica in a lower aliphatic-water solution of the partial condensate of a silanol of the formula $R^6Si(OH)_3$ wherein $R^6$ is selected from the group consisting of an alkyl radical containing 1 to 3 carbon atoms, the vinyl radical, the 3,3,3-trifluoropropyl radical, the gamma-glycidoxypropyl radical and the gamma-methacryloxypropyl radical, at least 70 weight percent of said silanol being $CH_3Si(OH)_3$, said composition containing sufficient acid to provide a pH in the range of 3.0 to 6.0;
(iv) evaporating the volatile solvents from said composition; and,
(v) applying heat to said composition to cure said composition, whereby said silanol is condensed further to a silsesquioxane.

26. The process of claim 25 wherein said organic silicon compound is represented by the general formula

$$R^4{}_cSiX_{4-c}$$

wherein c is an integer from 1 to 3 inclusive, X is an alkoxy, acyloxy or aryloxy radical, and $R^4$ is a compound represented by the formula

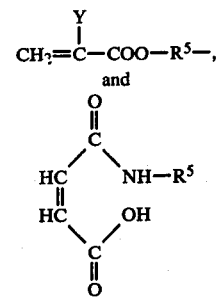

wherein Y is hydrogen or methyl, and $R^5$ is a divalent saturated aliphatic hydrocarbon radical.

27. The process of claim 26 wherein said polyfunctional acrylic acid ester monomer is represented by the formula

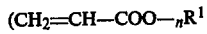
$$(CH_2=CH-COO-)_nR^1$$

wherein n is an integer from 2 to 4 inclusive, and $R^1$ is selected from the group consisting of an n valent saturated aliphatic hydrocarbon radical, n valent substituted saturated aliphatic hydrocarbon radical, n valent olefinically unsaturated aliphatic hydrocarbon radical, n valent substituted olefinically unsaturated aliphatic hydrocarbon radical, n valent ether radical, n valent substituted ether radical, n valent polyether radical, n valent substituted polyether radical, n valent aromatic hydrocarbon radical, and n valent substituted aromatic hydrocarbon radical.

28. The process of claim 27 wherein $R^1$ is selected from the group consisting of a n valent saturated aliphatic hydrocarbon radical, n valent olefinically unsaturated aliphatic hydrocarbon radical, n valent ether radical, n valent polyether radical, and n valent aromatic hydrocarbon radical.

29. The process of claim 24 wherein $R^1$ is selected from the group consisting of a n valent saturated aliphatic hydrocarbon radical, n valent ether radical, and n valent polyether radical.

30. The process of claim 27 wherein X is an alkoxy radical.

31. The process of claim 27 wherein $R^4$ is a compound represented by the formula

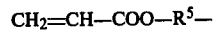
$$CH_2=CH-COO-R^5-$$

wherein R⁵ is a divalent saturated aliphatic hydrocarbon radical.

32. The process of claim 27 wherein R⁴ is a compound represented by the formula

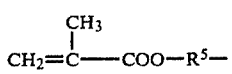

wherein R⁵ is a divalent saturated aliphatic hydrocarbon radical.

33. The process of claim 27 wherein R⁴ is a compound represented by the formula

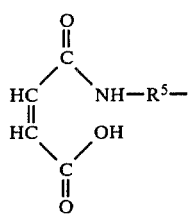

wherein R⁵ is a divalent saturated aliphatic hydrocarbon radical.

34. A polycarbonate article having improved scratch, mar, abrasion and chemical solvent resistance comprising a polycarbonate substrate having thereon (i) an ultraviolet radiation cured primer layer, said cured primer layer being the photoreaction product of a primer composition containing at least one polyfunctional acrylic acid ester monomer; at least one organic silicone compound containing at least one organic group having olefinic unsaturation and represented by the general formula $R^4_cSiX_{4-c}$ wherein X represents an alkoxy, acyloxy or aryloxy radical, R⁴ represent a compound represented by the formula

and

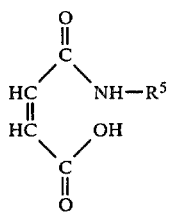

wherein Y is hydrogen or methyl and R⁵ is a divalent saturated aliphatic hydrocarbon radical, and c is an integer from 1 to 3, a photoinitiator, and a compound selected from resorcinol monobenzoate, lower alkyl substituted resorcinol monobenzoate, or mixtures thereof; and, (ii) a cured colloidal silica filled thermoset organopolysiloxane top coat on said cured primer layer, said top coat being the thermally cured product of a top coat composition comprising a dispersion of colloidal silica in a lower aliphatic alcohol-water solution of the partial condensate of a silanol of the formula R⁶Si(OH)₃ wherein R⁶ is selected from the group consisting of alkyl radicals containing 1 to 3 carbon atoms, the vinyl radical, the 3,3,3-trifluoropropyl radical, the gamma-glycidoxypropyl radical and the gamma-methacryloxypropyl radical, at least 70 weight percent of the silanol being CH₃Si(OH)₃, said composition containing sufficient acid to provide a pH in the range of 3.0 to 6.0.

35. The article of claim 34 wherein said polyfunctional acrylic acid ester monomer is represented by the general formula $(CH_2=CHOO-_nR^1$ wherein n is an integer from 2 to 4 inclusive, and R¹ is selected from the group consisting of a n valent saturated aliphatic hydrocarbon radical, n valent substituted saturated aliphatic hydrocarbon radical, n valent olefinically unsaturated aliphatic hydrocarbon radical, n valent substituted olefinically unsaturated aliphatic hydrocarbon radical, n valent ether radical, n valent substituted ether radical, n valent polyether radical, n valent substituted polyether radical, n valent aromatic hydrocarbon radical, and n valent substituted aromatic hydrocarbon radical.

36. The article of claim 35 wherein R¹ is selected from the group consisting of a n valent saturated aliphatic hydrocarbon radical, n valent olefinically unsaturated olefinic hydrocarbon radical, n valent radical, n valent polyether radical, and n valent aromatic hydrocarbon radical.

37. The article of claim 36 wherein R¹ is selected from the group consisting of a n valent saturated aliphatic hydrocarbon radical, n valent ether radical and n valent polyether radical.

38. The article of claim 37 wherein R⁴ is a compound represented by the formula

wherein R⁵ is a divalent saturated aliphatic hydrocarbon radical.

39. The article of claim 37 wherein R⁴ is a compound represented by the formula

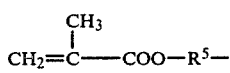

wherein R⁵ is a divalent saturated aliphatic hydrocarbon radical.

40. The article of claim 37 wherein R⁴ is a compound represented by the formula

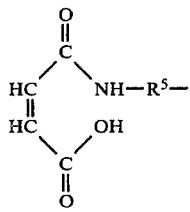

wherein R⁵ is a divalent saturated aliphatic hydrocarbon radical.

41. The article of claim 38 wherein X is an alkoxy radical.

42. The article of claim 39 wherein X is an alkoxy radical.

43. The article of claim 40 wherein X is an alkoxy radical.

* * * * *